(12) United States Patent
Rygaard (10) Patent No.: US 7,143,441 B2
(45) Date of Patent: Nov. 28, 2006

(54) WIRELESS DEVICE MOBILE APPLICATION SECURITY SYSTEM

(75) Inventor: Christopher A. Rygaard, Sunnyvale, CA (US)

(73) Assignee: Aramira Corporation, San Jose, CA (US)

( * ) Notice: Subject to any disclaimer, the term of this patent is extended or adjusted under 35 U.S.C. 154(b) by 612 days.

(21) Appl. No.: 09/851,763

(22) Filed: May 8, 2001

(65) Prior Publication Data

US 2002/0169983 A1 Nov. 14, 2002

(51) Int. Cl.
*G06F 11/00* (2006.01)
*G06F 11/22* (2006.01)
*G06F 11/32* (2006.01)
*G06F 11/36* (2006.01)

(52) U.S. Cl. .................... 726/22; 380/270; 713/161; 713/168; 713/169; 713/170; 455/410

(58) Field of Classification Search ........ 713/168–170, 713/217, 201, 161; 726/22; 380/270; 455/410
See application file for complete search history.

(56) References Cited

U.S. PATENT DOCUMENTS

| | | | |
|---|---|---|---|
| 5,633,932 A | 5/1997 | Davis et al. | |
| 5,850,516 A | 12/1998 | Schneier | |
| 5,850,517 A | 12/1998 | Verkler et al. | 395/200.32 |
| 5,963,731 A | 10/1999 | Sagawa et al. | |
| 5,968,176 A | 10/1999 | Nessett | |
| 5,974,549 A | 10/1999 | Golan | |
| 6,009,456 A | 12/1999 | Frew et al. | |
| 6,065,118 A | 5/2000 | Bull et al. | |
| 6,148,327 A | 11/2000 | Whitebread et al. | |
| 6,173,405 B1 | 1/2001 | Nagel | |
| 6,192,354 B1 | 2/2001 | Bigus et al. | |
| 6,233,601 B1 | 5/2001 | Walsh | 709/202 |
| 6,272,528 B1 | 8/2001 | Cullen et al. | 709/202 |
| 6,539,416 B1 | 3/2003 | Takewaki et al. | |
| 6,615,232 B1 | 9/2003 | Suzuki et al. | |
| 6,622,157 B1 | 9/2003 | Heddaya et al. | |

FOREIGN PATENT DOCUMENTS

| | | |
|---|---|---|
| EP | 0942370 A1 | 9/1999 |
| EP | 1 067 457 A | 1/2000 |

OTHER PUBLICATIONS

Wayne Jansen and Tom Karygiannis, "NIST Special Publication 800-19-Mobile Agent Security", Oct. 1999.*
*Intrusion Detection with Mobile Agents*, Computer Communications Journal, Special Issue on Intrusion Detection, Jansen.
*Determining Privileges of Mobile Agents*, Proceedings of the Computer Security Applications Conference, Dec. 2001. Jansen.
*A Privilege Management Scheme for Mobile Agent Systems*, First International Workshop on Security of Mobile Multiagent Systems, Autonomous Agents Conference, May 2001. Jansen.

(Continued)

Primary Examiner—Jacques Louis-Jacques
Assistant Examiner—Piotr Poltorak
(74) Attorney, Agent, or Firm—Fish & Richardson P.C.

(57) ABSTRACT

A mobile application security system and method, in the preferred embodiment, permits authentication of a user of a sensitive mobile application dispatched from a vulnerable host to occur, but does not perform user authentication for non-sensitive mobile applications or for sensitive mobile applications dispatched from non-vulnerable hosts. A hub and spoke architecture and a peer-to-peer architecture are described.

45 Claims, 5 Drawing Sheets

OTHER PUBLICATIONS

*Countermeasures for Mobile Agent Security*, Computer Communications, Special Issue on Advanced Security Techniques for Network Protection, Elsevier Science BV, Nov. 2000. Jansen.
*Privilege Management of Mobile Agents*, National Information System Security Conference, Oct. 2000. Jansen et al.
*Applying Mobile Agents to Intrusion Detection and Response* NISTIR 6416, Sep. 1999. Jansen et al.
*Mobile Agent Security*, NIST Special Publication 800-19, Aug. 1999. Jansen et al.
*Agents for the Masses: Is is Possible To Make Development of Sophisticated Agents Simple Enought To Be Practical?* IEEE Intelligent Systems, Special Issue on Agents, May-Jun. 1999. Bradshaw et al.
*Network Security Testing Using Mobile Agents* Third International Conference and Exhibition on the Practical Application of Intelligent Agents and multi-Agent Technology. London, UK Mar. 1998. Karygiannis.
*A Framework For Multi-Mode Authentication: Overview and Implementation Guide.* NISTIR 7046 Aug. 2003. Jansen et al.
*Picture Password: A Visual Login Technique for Mobile Devices.* NISTIR 7030, Jul. 2003. Jansen et al.
*Security Policy Management for Handheld Devices.* The Int'l. Conference on Security and Management (SAM'03), Jun. 2003. Jansen et al.
*Authenticating Users on Handheld Devices*, Proceedings of the Canadian Information Technology Security Symposium, May 2003. Jansen.
*Policy Expression and Enforcement for Handheld Devices*, NISTIR 6981, May 2003. Jansen et al.
*Assigning and Enforcing Security Policies on Handheld Devices*, Proceedings of the Canadian Information Technology Security Symposium, May 2002. Jansen et al.
PCT International Search Report dated Jan. 2, 2003 corresponding to PCT US02/21186.
Office Action dated Dec. 18, 2003 for U.S. Appl. No. 09/764,548, filed Jan. 18, 2001.
Office Action dated Dec. 22, 2003 for U.S. Appl. No. 09/591,034, filed Jun. 9, 2000.
Office Action dated Dec. 31, 2003 for U.S. Appl. No. 09/758,941, filed Jan. 10, 2001.
Office Action dated Dec. 31, 2003 for U.S. Appl. No. 09/645,028, filed Aug. 23, 2000.
W.A. Jansen, "A Privilege Management Scheme for Mobile Agent Systems" NIST May 2001.
Wayne Jansen, "Countermeasures for Mobile Agent Security", NIST Nov. 2000.
Wayne Jansen et al., "Privilege Management of Mobile Agents", NIST Oct. 2000.
W. Jansen, "Intrusion Detection with Mobile Agents" Computer Communications Journal, Special Issue On Intrusion Detection Oct. 2, 2001.
"Jumping Beans™ White Paper" Ad Astra Engineering, Incorporated Dec. 1998.
Holger Peine, "Security Concepts and Implementation in the Ara Mobile Agent System", Jun. 1998, (Wet Ice '98), Proceedings, Seventh IEEE International Workshops, Stanford, CA & Los Alamitos, CA, IEEE Comput. Soc., pp. 236-242.
Varadharajan V. et al., "An Approach to Designing Security Model for Mobile Agent Based Systems", Nov. 1998, Globecom '98, The Bridge to Global Integration, Sydney, Australia and Telecommunications Conference, New York, NY, IEEE, US, vol. 3, pp. 1600-1606.
Joan J. Ordille, "When agents roam, who can you trust?", 1996, Proceedings of the Annual Conference on Emerging Technologies and Applications in Communications, pp. 188-191.
Supplementary European Search Report, EP Application Serial No. 02 72 9170, Dec. 12, 2005, 4 pp.
Peter Mell et al., "A Denial of Service Resistant Intrusion Detection Architecture", NIST, 2000.
Peter Mell et al., "Mobile Agent Attach Resistant Distributed Hierarchical Intrusion Detection" NIST, 1999.
W.A. Jansen, "A Privilege Management Scheme for Mobile Agent Systems", NIST.
Wayne Jansen, "Countermeasures for Mobile Agent Security", NIST.
Wayne Janson et al., "Applying Mobile Agents to Intrusion Detection and Response" NIST Interim Report, Oct. 1999.
Wayne Janson et al., "Privilege Management of Mobile Agents", NIST.
Wayne Jansen et al., "NIST Special Publication 800-19—Mobile Agent Security", NIST.

\* cited by examiner

WIRELESS DEVICE MOBILE APPLICATION SECURITY SYSTEM

FIELD OF THE INVENTION

This invention relates generally to a mobile application security system and method and in particular to a mobile application authentication system and method that may be implemented for mobile applications that execute on various wireless devices.

BACKGROUND OF THE INVENTION

In traditional computing systems, communication between computers is either code (a software application) or data (a file containing information) and there is no notion of a program moving between hosts while it is being executed. Thus, with a typical computing system, a person may execute a software application (e.g., Microsoft Word) on his own computer and then forward the results of the execution of the software application (e.g., a Word document) to another user. The other user may then view the Word document by executing his own copy of Microsoft Word. A user may also send another user an executable software application file that the other user may download and execute on his own computer. However, these traditional computing systems do not recognize a single instantiation of a software program that may be executed by one or more different computers in order to complete the execution of the software application.

A mobile application, sometimes also called a mobile app or a mobile agent, is a currently executing computer software application/program, or part of a currently executing computer program that can physically move from one computer to another (between hosts) while it is being executed: A mobile application's software may or may not have been previously installed on a particular computers prior to the arrival of the mobile application. The mobile applications are said to jump from one computer to another computer and the process of jumping from one computer to another computer is also referred to as a jump.

The process of initiating a jump between computers is commonly known as a dispatch. Typically, each mobile application will carry with it an ordered list or tree of hosts which the mobile application must visit during its execution, and such a list or tree is called the mobile application's itinerary. The computers that can receive and dispatch mobile applications are called hosts. The collection of hosts, computer networks, and software which executes and supports the mobile applications, and the mobile applications themselves, is called the mobile application system.

A mobile application typically has at least two parts: the state and the code. The state of the mobile application contains all of the data stored, carried, and/or computed by the particular mobile application. The code of the mobile application is the set of computer instructions which the host computer is intended to carry out on behalf of the mobile application during the execution of the mobile application by the particular host computer. In addition, a mobile application may have other parts, including an Access Control List (ACL), an itinerary, a datastore, an audit log, etc. A mobile application's software may or may not have been previously installed on the computers prior to the arrival of the mobile application.

Mobile applications have demonstrable benefits for devices which employ wireless communication technologies. However, they also create a security problem. In particular, a lost or stolen wireless device might fall into the hands of an attacker who could use the mobile application system to attack both the mobile application system and other computing resources that are associated with the mobile application system. Thus, there is a need for a system by which a mobile application system can ensure that the person who is interacting with a host is allowed to do so. (e.g., that the wireless device used by the person is authenticated). Currently, the most popular authentication mechanism is a password. Typically, an application will request a password when the application is first invoked.

The use of a password for a mobile application presents a problem. In particular, with mobile applications, a host might be left running continuously in order to receive mobile applications from other hosts. In addition, a mobile application will typically be first invoked on one host and then later dispatched to another host. Thus, an attacker might be present at the receiving host and could possibly use the mobile application to attack. For these two reasons, and possibly others, traditional password authentication techniques do not suffice for mobile applications. Thus, it is desirable to provide a wireless device mobile application authentication system that overcomes the above problems with typical authentication systems and it is to this end that the present invention is directed.

SUMMARY OF THE INVENTION

The security system and method in accordance with the invention permits mobile applications to be used with vulnerable computing devices, such as wireless computer devices, cellular phones and the like. In particular, the security system performs an authentication in certain circumstances to ensure that the security of the computing system is not violated. In more detail, the system may assign a characteristic to each computing device and to each mobile application. For example, the system may assign a vulnerable indication to computing devices that may be misplaced or lost (e.g., cellular phones, handheld computer device and the like) and a non-vulnerable indicator to computer devices that are not likely to be lost or stolen (e.g., a mainframe computer or a database computer that is housed in a location that is not likely to be violated). The system may also designate certain mobile applications as sensitive (e.g., the data associated with the mobile application or the execution of the mobile application is critical and the access to the mobile application should be monitored) and certain mobile applications as non-sensitive (e.g., the particular mobile application does not contain sensitive information or the execution of the mobile application does not prompt security concerns). Using the above designations that may be assigned by various different entities (e.g., typically a trusted entity), the security system determines when an authentication is necessary prior to the dispatch of a mobile application from a dispatching host.

The security system and method may also implement a system wherein a trusted party may assign when an authentication must occur during the dispatching of the mobile application. For example, each mobile application may include an itinerary which lists the hosts to which the mobile application travels during its execution. For each host in the itinerary, there may be an indicator, such as a Boolean variable, that indicates whether or not an authentication must occur when the mobile application is dispatched from the particular host.

Thus, in accordance with the invention, a mobile application security system is provided wherein the mobile application security system may be a spoke and hub architecture, or a peer-to-peer network, or any other computing architecture. The mobile application security system comprises a management and security console computer that executes instructions for controlling the security of a mobile application and one or more host computers connected to the console computer wherein each host computer executes the mobile application that jumps between the hosts during execution. The security console further comprises means for monitoring the security of the mobile application as it jumps between a dispatching host and another host wherein information about the mobile application and the dispatching host is communicated to the console computer and means for determining if authentication of the dispatching host is required prior to dispatch of the mobile application. A method for mobile application security is also described. In addition, a peer-to-peer mobile application security system and method are also described.

DETAILED DESCRIPTION OF A PREFERRED EMBODIMENT

The invention is particularly applicable to a mobile application authentication system for wireless computing devices (e.g., cell phones, wireless e-mail devices, wireless computer devices and the like) and it is in this context that the invention will be described. It will be appreciated, however, that the system and method in accordance with the invention has greater utility since it may be used for the authentication of any vulnerable computing device and for any mobile application. To better understand the invention, a typical mobile application and an example of its execution will be provided.

Figure 1:
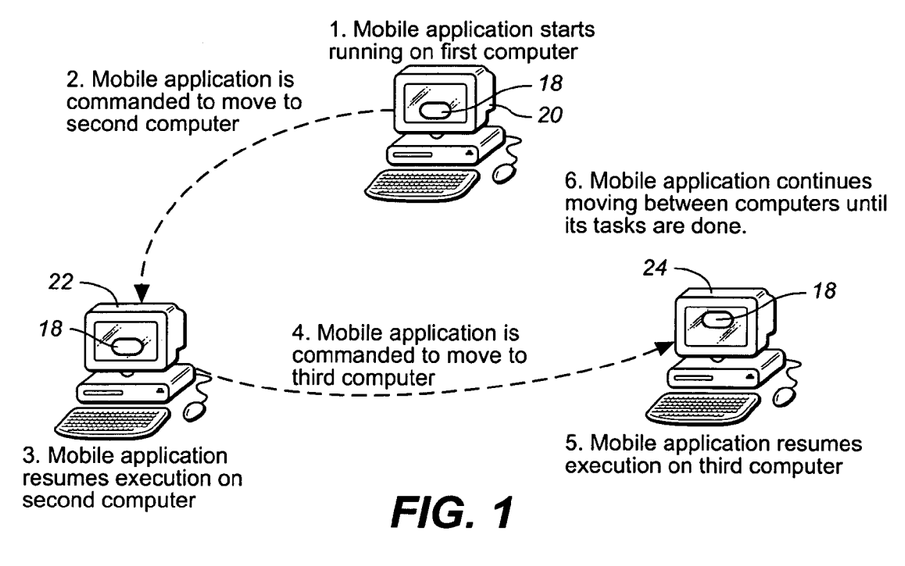
FIG. 1 illustrates a typical mobile application.

FIG. 1 illustrates a typical mobile application 18 and its operation. In particular, the mobile application may start its execution on a first computer 20. At some point, the mobile application 18 is instructed to move to a second computer 22 and the mobile application jumps to the second computer. Once at the second computer, the mobile application resumes its execution on the second computer. At some later time, the mobile application is instructed to move to a third computer 24 and the mobile application jumps to the third computer and resumes its execution on the third computer. In this manner, the mobile application can execute on one or more different computers at different times. To understand the concept of a mobile application, an example of a typical mobile application will now be provided.

Figure 2:
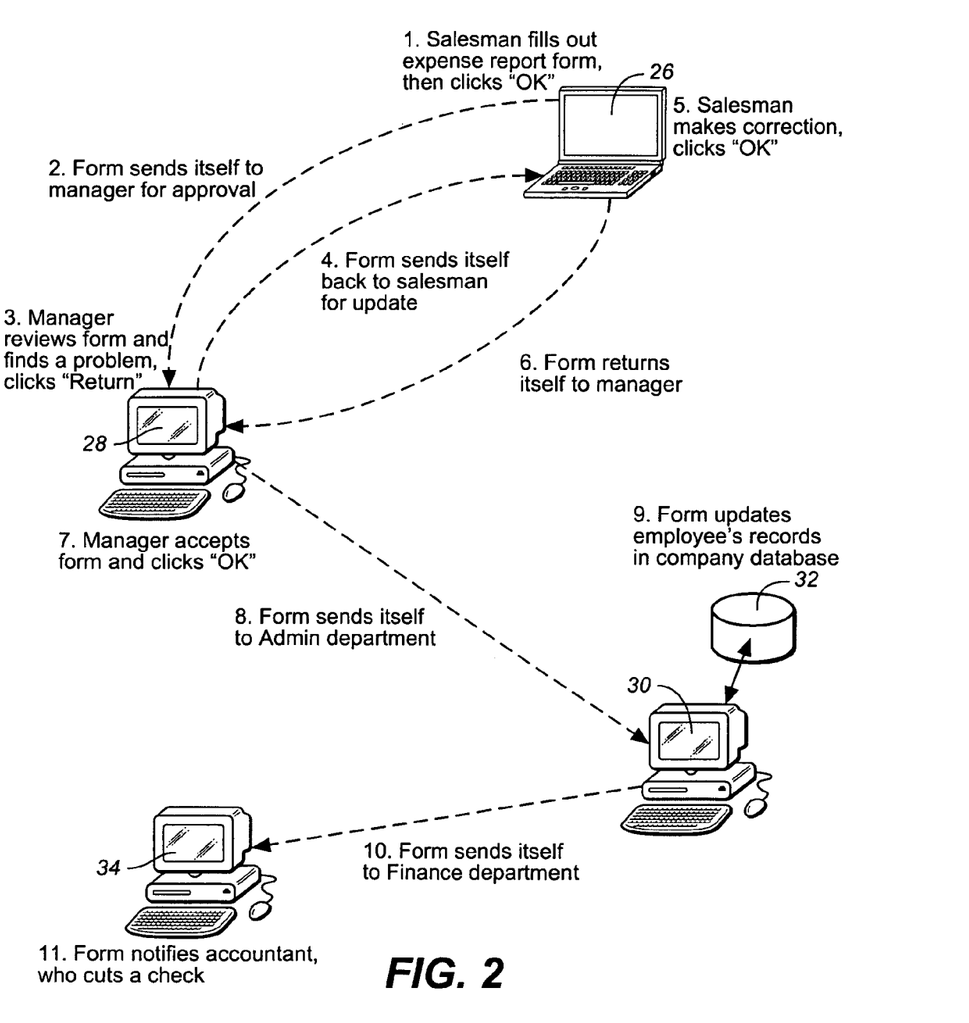
FIG. 2 illustrates an example of the execution of a typical mobile application.

FIG. 2 is a diagram illustrating an example of a typical mobile application and in particular, an intelligent expense report form. In this example, the mobile application facilitates the expense report process by automatically performing some functions. In particular, a salesman at a laptop computer 26 may initially fill out an expense report form and click OK when the expense report is ready. Automatically, the mobile application then sends itself to a manager's computer 28 for approval by the manager. In this example, the manager finds a problem with the form and returns it to the salesman so that the form automatically sends itself back to the salesman for an update. Next, the salesman makes the necessary corrections and clicks OK to send it automatically back to the manager. With the further updates, the manager accepts the expense form and clicks "OK". The mobile expense report form then automatically sends itself to a computer 30 in the administration department. The mobile expense form then executes on the administration computer and updates a database 32 with the new information in the expense form. Next, the mobile expense report automatically sends itself to a computer 34 of the accountant. The mobile expense report then automatically starts to execute on the accountant's computer and notifies the accountant that a check is needed so that the accountant can cut the check for the salesman. Thus, the mobile application has automated much of the expense report submission process so that the people involved in the process do not have to worry about ensuring that the expense report is approved. Now, the mobile application security system in accordance with the invention will be described.

Figure 3:
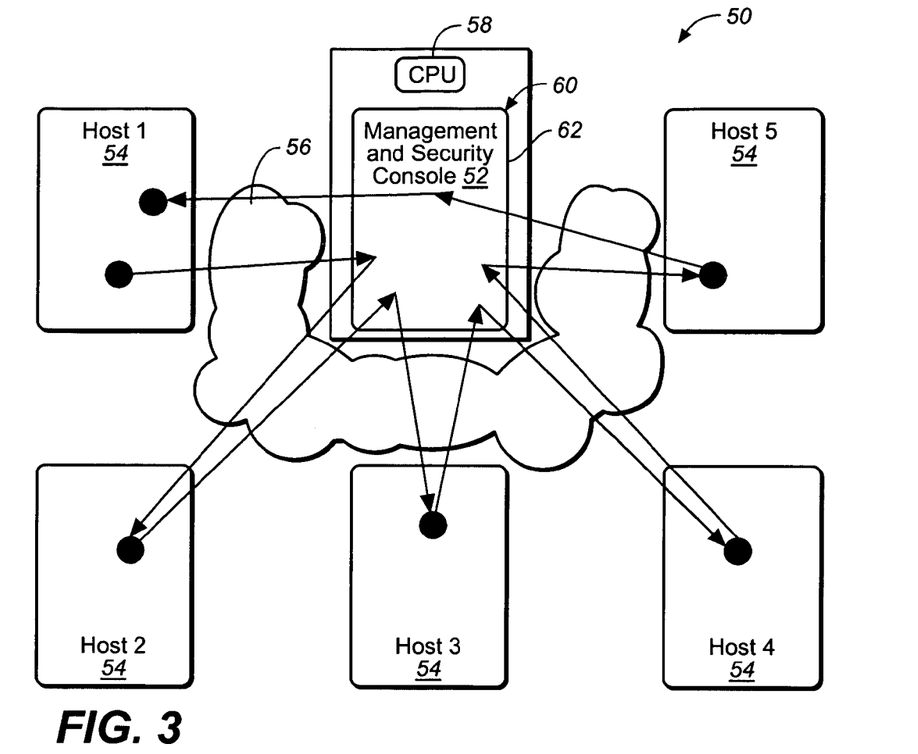
FIG. 3 illustrates an example of a preferred embodiment of the mobile application security system in accordance with the invention.

FIG. 3 illustrates an example of a preferred embodiment of the mobile application security system 50 in accordance with the invention. In this preferred embodiment, a client/server type system (also known as a hub and spoke arrangement) may be used. However, other computer architectures and other configurations may also be used without departing from the scope of the invention. The system may include a server computer 52 and one or more host computers 54, such as Host 1, Host 2, Host 3, Host 4 and Host 5, that may be connected to the server computer by a computer network 56, such as a wide area network, the Internet, the World Wide Web, a telephone line and a modem or the like. The computer network permits the server and hosts to communicate data between each other. Each host may be a typical computer system that includes a CPU and a memory for executing a software application such as a mobile application.

The server 52 may include a CPU 58 and a memory 60 along with a persistent storage device (not shown) for permanently storing one or more software applications or modules that may be executed by the CPU by loading the software applications or modules into the memory. The server may also include a management and security console 62 that controls the security of the mobile application system. In a preferred embodiment, the management and security console 62 may be one or more pieces of software stored in the memory 60 and executed by the CPU 58 to implement the security system and in particular the authentication system in accordance with the invention. Now, a method for authentication in accordance with the invention will be described in more detail.

Figure 4:
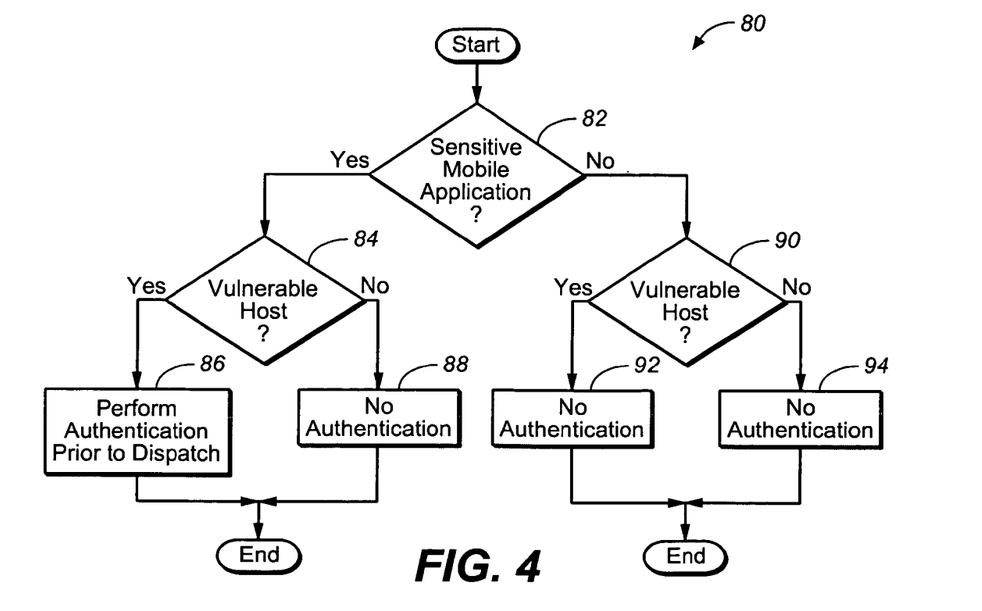
FIG. 4 is a diagram illustrating a method for authentication in accordance with the invention.

FIG. 4 is a diagram illustrating a method 80 for authentication in accordance with the invention that may be implemented in the management and security console for each mobile application jumping to a particular host. In order to implement this technique, the mobile application system must support certain features. First, a system administrator or some other trusted party may have the ability to mark each host as either vulnerable or not vulnerable. A host may be vulnerable if it is likely that a person other than the authorized user may have access and control of the host. For example, wireless devices such as cellular phones or wireless e-mail devices, may be vulnerable hosts since they can be lost or stolen very easily. Second, an application developer or other trusted party may have the ability to mark each mobile application as being either sensitive or not sensitive wherein each mobile application can be designated as sensitive when the mobile application is first created, or at some later point in its lifecycle. For example, a mobile application that is an expense report is sensitive since it contain sensitive information while a mobile application that determines the software installed on each host may be not sensitive since the mobile application cannot do any nefarious actions. With at least these two capabilities, the mobile application system has enough information to determine when authentication is required.

In particular, in step 82 the management and security console may determine if the particular mobile application is sensitive based on the indicator created at the time the mobile application is created or at some later point by the trusted party. If the mobile application is sensitive, then the console may determine if the host that the mobile application is dispatched from is a vulnerable host in step 84. Obviously, these steps may occur in a different sequence without departing from the scope of the invention. If the host is vulnerable, then the console will perform an authentication as part of the dispatch of the mobile application from the vulnerable host in step 86.

To perform the authentication in a preferred embodiment, when the user password at host 54 is created, updated, generated, or otherwise assigned to the user of host 54, a digest (such as an Secure Hash Algorithm (SHA) digest) of the password is computed by host 54 and saved on the management and security console. This digest may be called "Digest1". Before the mobile application is dispatched, host 54 asks the user for the correct password, and then computes a digest of the password just entered by the user. This digest may be called "Digest4". When the mobile application is dispatched, a new digest is computed from (1) information about the mobile application, such as the serialized mobile application, and (2) Digest4. This is "Digest2". Digest 2 is then sent to the management and security console along with the mobile application. The management and security console computes another digest ("Digest3") from (1) Digest1 and (2) information about the received mobile application. The management and security console then compares Digest2 and Digest3. If Digest2 and Digest3 are identical, the authentication passes. If Digest2 and Digest3 are not identical, then the authentication fails.

If the host is not vulnerable, then no authentication is required in step 88. Returning to step 82, if the mobile application is not sensitive, then the console determines if the host is vulnerable in step 90. Whether or not the host is vulnerable (as shown in steps 92 and 94), no authentication occurs since the mobile application is not sensitive so it does not matter whether or not the host is vulnerable. In this manner, the need for authentication of a particular mobile application being dispatched from a particular host is determined to ensure the security for the mobile application system when necessary. Now, an example of the application of the above method will be described.

Figure 5:
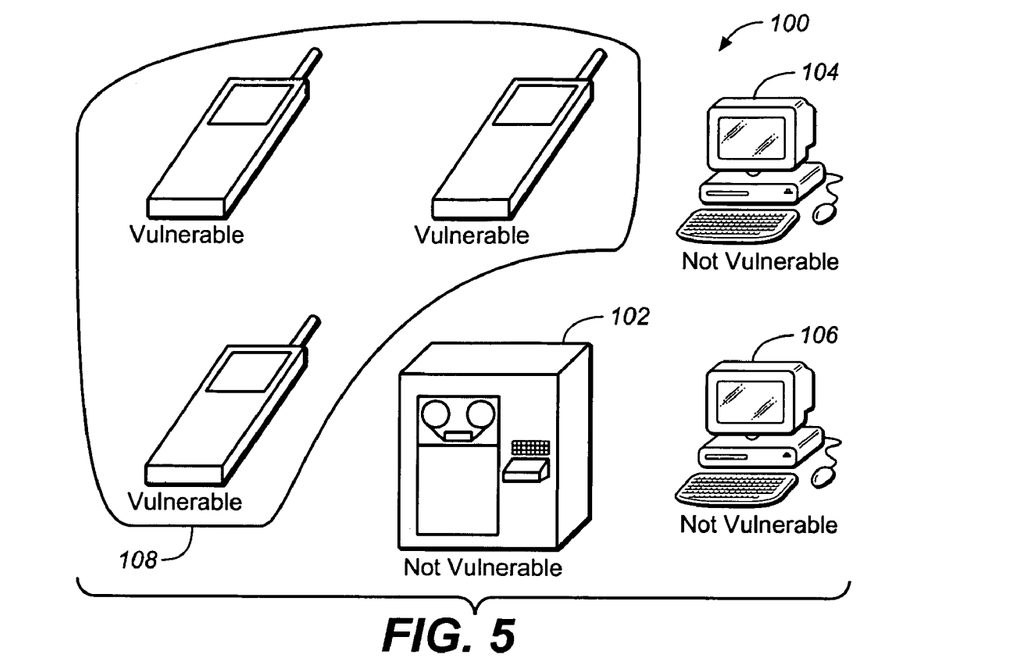
FIG. 5 illustrates an example of various computing devices that are designated as vulnerable or non-vulnerable in accordance with the invention.

FIG. 5 illustrates an example of various computing devices in a company's computer system 100 that are designated as vulnerable or non-vulnerable in accordance with the invention. In particular, the company has several computers participating in the mobile application system, including a large mainframe computer 102 securely located at the company headquarters (and therefore designated as not vulnerable), one or more desktop computers 104, 106 securely located in the company offices (and therefore designated as not vulnerable by the system administrator or some other trusted party), and one or more wireless devices 108 in the hands of the company's field workforce that are designated as vulnerable by the trusted party since the wireless device can be lost or stolen and fall into the control of the wrong people.

Figure 6:
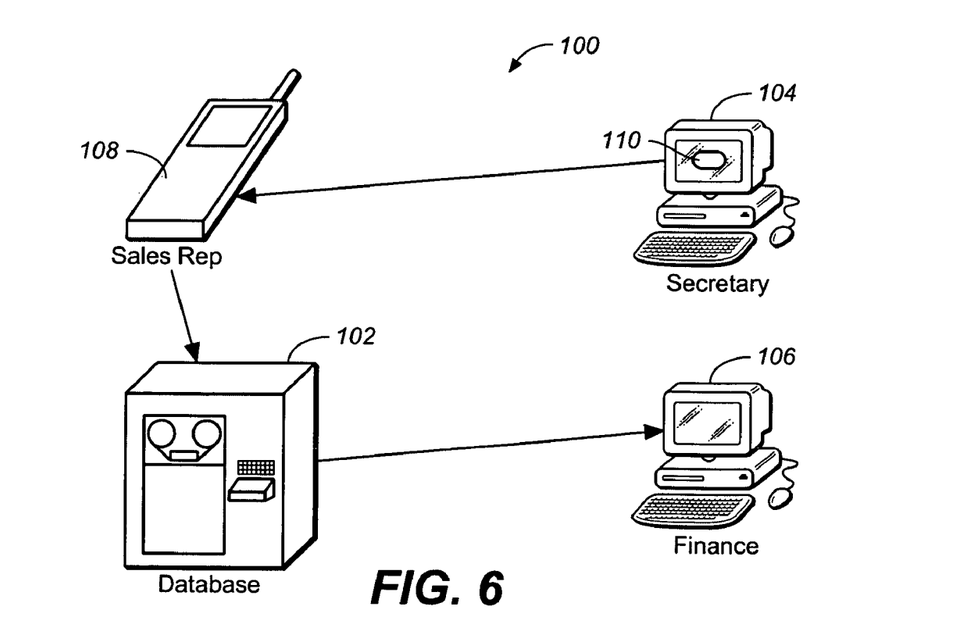
FIG. 6 illustrates an example of a transaction that utilizes the computing devices shown in FIG. 5.
Figure 7:
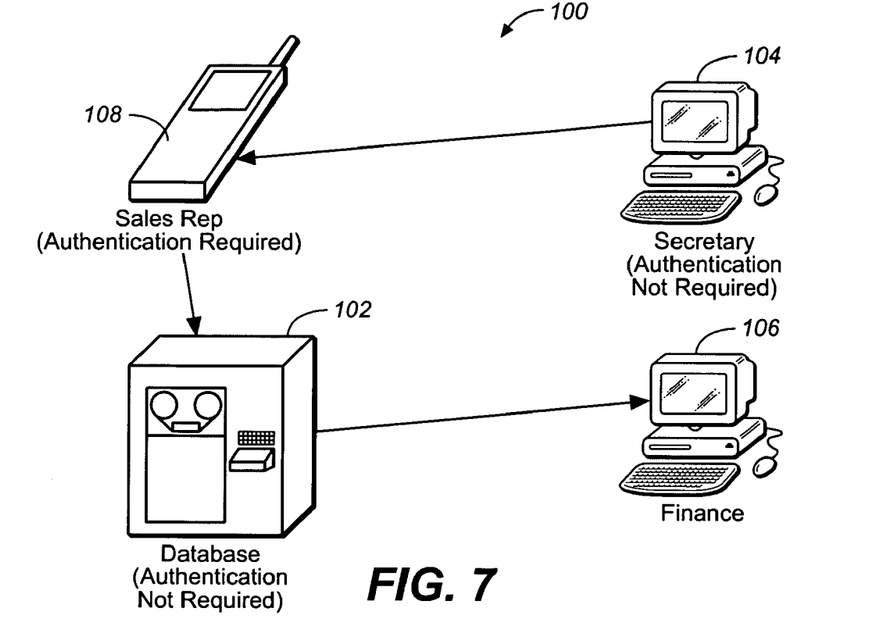
FIG. 7 illustrates the transaction of FIG. 6 with the authentication requirements for each computing device, assuming the mobile application is designated as "sensitive"

In this example, two different mobile applications are launched. The first mobile application is an expense report. Because this mobile application effects the disbursement of money, it is designated by the trusted party or system administrator as sensitive. As shown in FIG. 6, this mobile application 110 is started at the secretary's desktop computer 104, then jumps to the sales representative's handheld device 108 to be filled out. From there, it jumps to the mainframe computer 102 to update the corporate database and then jumps to the Finance Department 106 to cut a check. As shown in FIG. 7, at each hop, the mobile application system checks to see if the dispatching host is vulnerable since it is a sensitive mobile application. Because this is a sensitive mobile application, the mobile application system will require authentication immediately prior to dispatching from a vulnerable host which is the wireless device 108. The dispatches from the other hosts is not performed since the other hosts are not vulnerable.

Figure 8:
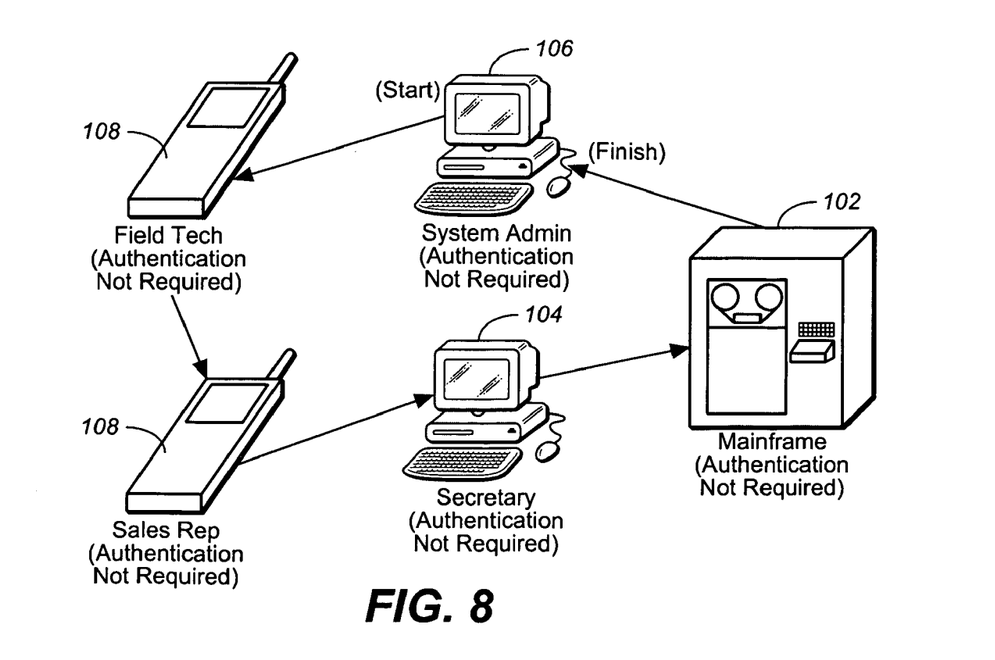
FIG. 8 illustrates an example of the execution of the transaction shown in FIG. 6 using the mobile application security system in accordance with the invention, assuming the mobile application is designated as "not sensitive".

The second mobile application in this example is for system management which is not vulnerable. The authentication for the second mobile application is shown in FIG. 8. This mobile application will take inventory of all of the software installed on each of the hosts it visits. By dispatching this mobile application to visit all of the hosts, the system administrator can take inventory of the entire system. Because this mobile application does not perform any potentially harmful activities, it is designated as not sensitive and therefore authentication is never needed for this mobile application as shown in FIG. 8. Now, a preferred embodiment of the system will be described in more detail.

The most effective technique to securely implement this invention is as part of a spoke-and-hub arrangement as shown in FIG. 3 and described above. With this architecture, the management and security console will reinforce the security of each mobile application during each jump. To accomplish this, each participating host is registered by some mechanism with the management and security console and the management and security console contains information about which hosts are vulnerable and which hosts are not vulnerable. Typically, such information is entered by the system administrator through the management and security console. When a mobile application is created, it is marked as sensitive. Alternatively, it can be marked as sensitive at some later point in its lifecycle. Once a mobile application is marked as sensitive, it can no longer be marked as not sensitive. The management and security console can enforce this. The mobile application system may also be implemented as a peer-to-peer system wherein the management and security console is connected to each host. In addition, the mobile application system may also be implemented as a peer-to-peer system without any centralized computer, wherein the hosts collaboratively perform the appropriate authentication.

When a vulnerable host prepares to dispatch a sensitive mobile application, it performs the authentication. On dispatch, the host sends (along with the mobile application) information about the authentication to the management and security console. This information must be sufficient to securely determine if the authentication has passed or not. If the management and security console determines that the authentication did not pass, then the management and security console will reject the mobile application. In accordance with another aspect of the invention, the mobile application system could require authentication before a sensitive mobile application is allowed to arrive at a vulnerable host.

In accordance with another aspect of the invention, an application developer or another trusted person might want to require authentication just before a dispatch even though the method described above would not require authentication. Thus, this alternative embodiment of the invention allows more direct control over when authentication is required. With this invention, an application developer, an end user, a system administrator, or some other suitably trusted person can specify on which jump(s) authentication is required prior to dispatch. When the mobile application is created, or at some later point in its lifecycle, a trusted person can specify to the mobile application system on which jumps authentication is required immediately prior to dispatch. To implement this embodiment, each mobile application has associated with it an itinerary. Each node of the itinerary can contain a boolean variable which indicates whether or not authentication is required prior to dispatching from that node.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A mobile application security system, comprising:
a management and security console computer connected to one or more hosts, each host configured to execute a mobile application that jumps between hosts during execution, the management and security console computer comprising means for monitoring security of the mobile application as it jumps between a dispatching host and another host wherein information about the mobile application and the dispatching host is communicated to the management and security console computer, the security monitoring means further comprising means for determining if authentication of a user of the dispatching host is required prior to dispatch of the mobile application responsive to means for determining if the mobile application is a sensitive mobile application and determining if the dispatching host is a vulnerable host, and means for requesting authentication if authentication of the user is required.

2. The system of claim 1, wherein requesting means requests the authentication if a sensitive mobile application is being dispatched.

3. The system of claim 1, wherein requesting means requests the authentication if a mobile application is being dispatched from a vulnerable host.

4. The system of claim 1, wherein the management and security console computer further comprises means for authenticating the user based on one or more rules defined by a managing user.

5. The system of claim 1, wherein the management and security console computer further comprises means for assigning a vulnerable classification or a non-vulnerable classification to each host.

6. The system of claim 1, wherein the management and security console computer further comprises means for assigning a sensitive classification or a non-sensitive classification to each mobile application as the mobile application is created.

7. The system of claim 1, wherein each mobile application comprises an itinerary listing a node for each host to which the mobile application jumps in the mobile application system wherein each node indicates if the authentication is required to jump from the particular host and wherein the requesting means requests the authentication based on the node in the itinerary.

8. The system of claim 1, wherein a host comprises one or more wireless devices that are classified as vulnerable.

9. A mobile application security method, comprising:
receiving data about a mobile application at a security node each time the mobile application jumps from a dispatching host to another host;
determining if authentication of a user of the dispatching host is required prior to dispatch of the mobile application, including determining if the mobile application is a sensitive mobile application and determining if the dispatching node is a vulnerable node; and
responsive to determining, requesting authentication if authentication of the user is required.

10. The method of claim 9, wherein requesting comprises requesting the authentication if a sensitive mobile application is being dispatched.

11. The method of claim 9, wherein requesting comprises requesting the authentication if a mobile application is being dispatched from a vulnerable host.

12. The method of claim 9, further comprising authenticating the user based on one or more rules defined by a managing user.

13. The method of claim 9, further comprising assigning a vulnerable classification or a non-vulnerable classification to each host.

14. The method of claim 9, further comprising assigning a sensitive classification or a non-sensitive classification to each mobile application as the mobile application is created.

15. The method of claim 9, wherein each mobile application comprises an itinerary listing a node for each host to which the mobile application jumps, wherein each node indicates if authentication is required to jump from the particular host and wherein requesting further comprises requesting the authentication based on the node in the itinerary.

16. The method of claim 9, wherein a host comprises one or more wireless devices that are classified as vulnerable.

17. A mobile application security system, comprising:
a management and security node connected to one or more nodes of a peer-to-peer network, each node configured to execute a mobile application, the management and security node comprising means for monitoring security of the mobile application as it jumps between the one or more nodes wherein data about the mobile application is communicated to the management and security node prior to the mobile application being dispatched from a dispatching node, the security monitoring means further comprising means for determining if authentication of a user of the dispatching node is required prior to dispatch of the mobile application responsive to means for determining if the mobile application is a sensitive application and determining if the dispatching node is a vulnerable node, and means for requesting authentication if authentication of the user is required.

18. The system of claim 17, wherein the requesting means requests the authentication if a sensitive mobile application is being dispatched.

19. The system of claim 17, wherein the requesting means requests the authentication if a mobile application is being dispatched from a vulnerable node.

20. The system of claim 17, wherein the management and security node further comprises means for authenticating the user based on one or more rules defined by a managing user.

21. The system of claim 17, wherein the management and security node further comprises means for assigning a vulnerable classification or a non-vulnerable classification to each node.

22. The system of claim 17, wherein the management and security node further comprises means for assigning a sensitive classification or a non-sensitive classification to each mobile application as the mobile application is created.

23. The system of claim 17, wherein each mobile application comprises an itinerary listing a node for each node to which the mobile application jumps in the mobile application system wherein each node indicates if the authentication is required to jump from the particular node and wherein the requesting means requests the authentication based on the node in the itinerary.

24. The system of claim 17, wherein a node comprises one or more wireless devices that are classified as vulnerable.

25. A mobile application security method, comprising:
receiving data about a mobile application at a management and security node each time the mobile application is being dispatched from a dispatching node in a peer-to-peer network;
determining if authentication of a user of the dispatching node is required prior to dispatch of the mobile application, including determining if the mobile application is a sensitive application and determining if the dispatching node is a vulnerable node; and
responsive to determining, requesting authentication if authentication of the user is required.

26. The method of claim 25, wherein requesting comprises requesting the authentication if a sensitive mobile application is being dispatched.

27. The method of claim 25, wherein requesting comprises requesting the authentication if a mobile application is being dispatched from a vulnerable node.

28. The method of claim 25, comprising authenticating the dispatching node based on one or more rules defined by a managing user.

29. The method of claim 25, further comprising assigning a vulnerable classification or a non-vulnerable classification to each node.

30. The method of claim 25, further assigning a sensitive classification or a non-sensitive classification to each mobile application as the mobile application is created.

31. The method of claim 25, wherein each mobile application comprises an itinerary listing a node for each node to which the mobile application jumps wherein each node indicates if authentication is required to jump from the particular node and wherein requesting further comprises requesting the authentication based on the node in the itinerary.

32. The method of claim 25, wherein a node comprises one or more wireless devices that are classified as vulnerable.

33. A mobile application security system, comprising:
a mobile application capable of jumping between hosts during execution; and
a management and security node, in communication with the hosts, the management and security node configured to determine whether to authenticate a user of a dispatching host prior to dispatch of the mobile application responsive to a vulnerability classification of the dispatching host and a sensitivity classification of the mobile application, and request authentication if authentication of the user is required.

34. The mobile application security system of claim 33 wherein the management and security node requests the authentication responsive to the dispatching host being classified as vulnerable and the mobile application being classified as sensitive.

35. The mobile application system of claim 34 wherein the dispatching host is classified as vulnerable if comprising one from the group containing a wireless device, a mobile device, a handheld device, and a laptop computer.

36. The mobile application security system of claim 33 wherein the management and security node does not request the authentication of the mobile application responsive to the dispatching host being classified as non-vulnerable or the mobile application being classified as non-sensitive.

37. The mobile application system of claim 33 wherein the management and security node receives the mobile application from the dispatching host, and dispatches the mobile application to the receiving host responsive to determining that the authentication is not required or authenticating the mobile application.

38. The mobile application security system of claim 33 wherein the management and security node authenticates the mobile application including receiving a first authentication data prior a jump, receiving a second authentication data during the jump, and comparing the first and second authentication data.

39. The mobile application security system of claim 33 wherein the management and security node authenticates the dispatching host.

40. The mobile application security system of claim 33 herein the management and security node authenticates the dispatching host prior to dispatch.

41. The mobile application security system of claim 33 wherein the hosts do not include the management and security node.

42. The mobile application security system of claim 33 further comprising a host.

43. A mobile application security system, comprising:
a mobile application capable of jumping between hosts during execution; and
a dispatching host, in communication with a management and security node, the dispatching host configured to provide a vulnerability classification of the dispatching host and a sensitivity classification of the mobile application to the management and security node prior to dispatch in order to determine whether authentication of a user of the dispatching host is required, and to assist authentication of the user responsive to receiving an authentication request.

44. The mobile application security system of claim 43 wherein the dispatching host sends authentication information to the management and security node to perform the authentication.

45. The mobile application security system of claim 43 wherein the dispatching host dispatches the mobile application to the management and security node.

* * * * *